(12) United States Patent
Uetani et al.

(10) Patent No.: US 8,911,648 B2
(45) Date of Patent: Dec. 16, 2014

(54) REACTIVE POLYMER-SUPPORTED POROUS FILM FOR BATTERY SEPARATOR, METHOD FOR PRODUCING THE POROUS FILM, METHOD FOR PRODUCING BATTERY USING THE POROUS FILM, AND ELECTRODE/POROUS FILM ASSEMBLY

(75) Inventors: Yoshihiro Uetani, Ibaraki (JP); Keisuke Kii, Ibaraki (JP); Tomoaki Ichikawa, Ibaraki (JP); Michio Satsuma, Ibaraki (JP); Satoshi Nishikawa, Takatsuki (JP); Shinji Bessho, Takatsuki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/612,021

(22) Filed: Sep. 12, 2012

(65) Prior Publication Data

US 2013/0004654 A1    Jan. 3, 2013

Related U.S. Application Data

(62) Division of application No. 11/267,404, filed on Nov. 7, 2005, now abandoned.

(30) Foreign Application Priority Data

Nov. 8, 2004 (JP) .................................. 2004-324258

(51) Int. Cl.
*B29C 65/00* (2006.01)
*B01D 39/00* (2006.01)
(Continued)

(52) U.S. Cl.
CPC .............. *B32B 27/28* (2013.01); *H01M 2/145* (2013.01); *B32B 2266/0271* (2013.01);
(Continued)

(58) Field of Classification Search
CPC ................... B32B 2250/24; B32B 2266/0271; B32B 2457/10; B32B 27/38; B01D 2323/30; B01D 2325/022; B01D 63/061; B01D 63/067; B01D 67/0093; B01D 71/36; H01M 2/16; C08B 3/00; B29C 42/00
USPC .................. 210/490, 500.35, 500.27, 500.36, 210/500.42; 264/41; 429/303, 310, 311, 429/314, 144; 525/112, 188; 95/45; 96/4, 96/10; 521/27; 29/623.5
See application file for complete search history.

(56) References Cited

U.S. PATENT DOCUMENTS 3,892,665 A * 7/1975 Steigelmann et al. ......... 210/490
4,242,208 A * 12/1980 Kawaguchi et al. ..... 210/500.28
(Continued)

FOREIGN PATENT DOCUMENTS

EP    1 432 054 A1    6/2004
EP    1 453 122 A2    9/2004
(Continued)

OTHER PUBLICATIONS

Chinese Second Office Action dated Jul. 24, 2009.
(Continued)

*Primary Examiner* — Ana Fortuna
(74) *Attorney, Agent, or Firm* — Sughrue Mion, PLLC (57) ABSTRACT

A reactive polymer-supported porous film for separator, that has sufficient adhesiveness between electrodes and separator and can suitably be used to produce a battery having low internal resistance and high rate performance, a method for producing the porous film, a method for producing a battery using the porous film, and an electrode/porous film assembly are disclosed. The reactive polymer-supported porous film for battery separator includes a porous film substrate having supported thereon a reactive polymer obtained by reacting a crosslinkable polymer having at least one reactive group selected from the group consisting of 3-oxetanyl group and epoxy group in the molecule, with an acid anhydride, thereby partially crosslinking the polymer.

3 Claims, 1 Drawing Sheet

(51) Int. Cl.
    *H01M 2/16*    (2006.01)
    *H01M 2/14*    (2006.01)
    *B32B 27/38*   (2006.01)
    *B32B 27/06*   (2006.01)
    *B32B 5/18*    (2006.01)
    *B32B 27/08*   (2006.01)
    *B32B 27/28*   (2006.01)
    *H01M 10/052*  (2010.01)

(52) U.S. Cl.
    CPC ............ *B32B 27/38* (2013.01); *H01M 2/1686* (2013.01); *B32B 27/065* (2013.01); *B32B 5/18* (2013.01); *B32B 2307/206* (2013.01); *H01M 2/1653* (2013.01); *B32B 2250/02* (2013.01); *H01M 2/1673* (2013.01); *B32B 27/08* (2013.01); *B32B 2457/10* (2013.01); *B32B 2250/24* (2013.01); *H01M 10/052* (2013.01); *H01M 2300/0085* (2013.01); *B32B 2307/202* (2013.01)
    USPC .. 264/41; 264/45.1; 210/500.27; 210/500.35; 521/27; 429/144; 429/303; 429/310

(56) References Cited

U.S. PATENT DOCUMENTS

| | | |
|---|---|---|
| 5,244,944 A | 9/1993 | Bott et al. |
| 5,821,305 A | 10/1998 | Schutyser et al. |
| 6,686,095 B2 | 2/2004 | Hayase et al. |
| 7,267,910 B2 * | 9/2007 | Hayase et al. ............... 429/300 |
| 7,449,111 B2 | 11/2008 | Hedhli et al. |
| 7,947,790 B2 * | 5/2011 | Katsurao et al. ............. 526/242 |
| 8,298,743 B2 * | 10/2012 | Naoi et al. .................... 430/165 |
| 2006/0099497 A1 * | 5/2006 | Uetani et al. ................. 429/144 |
| 2010/0137540 A1 * | 6/2010 | Ito et al. ....................... 526/279 |

FOREIGN PATENT DOCUMENTS

| | | |
|---|---|---|
| JP | 5-310989 A | 11/1993 |
| JP | 9-12756 A | 1/1997 |
| JP | 10-172537 A | 6/1998 |
| JP | 10-172606 A | 6/1998 |
| JP | 10-177865 A | 6/1998 |
| JP | 10-189054 A | 7/1998 |
| JP | 11-116663 A | 4/1999 |
| JP | 11-260341 A | 9/1999 |
| JP | 2000-251944 A | 9/2000 |
| JP | 2000-268875 A | 9/2000 |
| JP | 2000-306569 A | 11/2000 |
| JP | 2002-15773 A | 1/2002 |
| JP | 2002-110245 A | 4/2002 |
| JP | 2002-151042 A | 5/2002 |
| JP | 2002-305032 A | 10/2002 |
| JP | 2003-109663 A | 4/2003 |
| JP | 2003-142158 A | 5/2003 |

OTHER PUBLICATIONS

European Search Report dated Jan. 30, 2006.

\* cited by examiner

REACTIVE POLYMER-SUPPORTED POROUS FILM FOR BATTERY SEPARATOR, METHOD FOR PRODUCING THE POROUS FILM, METHOD FOR PRODUCING BATTERY USING THE POROUS FILM, AND ELECTRODE/POROUS FILM ASSEMBLY

CROSS REFERENCE TO RELATED APPLICATIONS

This is a Divisional of U.S. application Ser. No. 11/267,404 filed Nov. 7, 2005, which claims priority to Japanese Application No. JP 2004-324258 filed Nov. 8, 2004, the disclosures of all of which are hereby incorporated by reference.

FIELD OF THE INVENTION

The present invention relates to a reactive polymer-supported porous film for battery separator, comprising a porous film substrate having supported thereon a reactive polymer comprising a partially crosslinked polymer, a method for producing the reactive polymer-supported porous film, a method for producing a battery by adhering electrodes to a separator using the reactive polymer-supported porous film, and an electrode/porous film assembly.

DESCRIPTION OF THE RELATED ART

In recent years, lithium ion secondary batteries with high energy density have been widely used as a power source of small-type hand-held electronic devices such as cell phone and laptop personal computer. Such lithium ion secondary batteries are produced by a process including a step of laminating or winding, for example, a polyolefin resin-porous film on or around positive and negative electrodes in a sheet form to place the resulting laminate in a battery container made of, for example, a metal can, a step of pouring an electrolyte solution in the battery container, and a step of sealing the battery container or sealing the opening of the battery container.

However, very strong demands for downsizing such small-type hand-held electronic devices as described above into small weight have prevailed recently. Lithium ion secondary batteries of a thinner type and a smaller weight have been desired. Therefore, battery containers of laminate seal type are now used in place of the conventional metal can containers.

Compared with the conventional metal can containers, such battery containers of laminate seal type have the following disadvantages. Because face pressure for maintaining the electric connection between the separator and the electrodes cannot sufficiently be applied to the face of the electrodes, the distance between the electrodes partially gets longer over time due to the expansion and shrinkage of electrode active substances during the charge or discharge of the battery. Thus, the internal resistance of the battery increases, involving deterioration of the battery performance. Additionally, the occurrence of resistance variation inside the battery also disadvantageously deteriorates the battery performance.

In the case of producing a sheet-like battery of a large area, the distance between the electrodes cannot be fixed, so that satisfactory battery performance cannot be obtained due to the resulting resistance variation inside the battery.

To overcome the above-described problems, it has conventionally been proposed to join electrodes and a separator by an adhesive resin layer comprising an electrolyte solution phase, a polymer gel layer containing an electrolyte solution and a polymer solid phase (for example, JP-A-10-177865). It is further proposed to obtain a battery comprising electrodes adhered to a separator, by coating a separator with a binder resin solution containing a poly(vinylidene fluoride) resin as the main component, superposing electrodes thereon, followed by drying to prepare a battery laminate, charging the battery laminate in a battery container, and pouring an electrolyte solution in the battery container (for example, JP-A-10-189054).

It is also proposed to obtain a battery comprising electrodes adhered to a separator, by joining a separator impregnated with an electrolyte solution to positive and negative electrodes through a porous adhesive resin layer for closely contacting those, and holding the electrolyte solution in the through holes (for example, JP-A-10-172606).

According to those processes, however, thickness of the adhesive resin layer must increase in order to obtain sufficient adhesive force between the separators and the electrodes. Further, because the amount of the electrolyte solution relative to the adhesive resin cannot increase, the internal resistance of the resulting batteries is high, so that satisfactory cycle performance and high-rate discharge performance cannot be obtained, which is disadvantageous.

On the other hand, various production methods have conventionally been known to produce a porous film for battery separator. One of the methods is a method of producing a sheet comprising a polyolefin resin, and stretching the sheet at high stretching ratio (for example, JP-A-9-12756). However, a battery separator comprising such a porous film obtained by stretching at high stretching ratio gives rise to the problem that a battery remarkably shrinks under high temperature environment such as a case that temperature abnormally elevates by, for example, internal short circuit, and in some cases, the separator does not function as a partition wall between electrodes.

To improve safety of batteries, reduction in a coefficient of heat shrinkage of battery separator under such a high temperature environment is the important problem. In this regard, to suppress a coefficient of heat shrinkage of battery separator under high temperature environment, a method is known, comprising melt kneading ultrahigh molecular weight polyethylene and a plasticizer, extruding the resulting mixture into a sheet from a die, and removing the plasticizer from the sheet by extraction, thereby producing a porous film used for a battery separator (for example, JP-A-5-310989). However, according to this method, the porous film obtained does not undergo stretching, opposed to the above-described conventional method. Thus, this method involves the problem that the film does not have sufficient strength.

Further, as described above, there is the proposal to provide an adhesive resin layer between a separator and an electrode (for example, JP-A-10-177865, JP-A-10-189054 and JP-A-10-172606). In such a battery, an electrode and a separator are adhered through the adhesive resin layer. However, strength of a resin forming the adhesive resin layer deteriorates under high temperature environment, and as a result, heat shrinkage of the separator cannot sufficiently be suppressed.

SUMMARY OF THE INVENTION

The present invention has been made to overcome the problems in the production of batteries by adhering electrodes to separators.

Accordingly, one object of the present invention is to provide a reactive polymer-supported porous film for battery separator, which can suitably be used for the production of a battery having sufficient adhesiveness between electrodes and a separator, low internal resistance and high-rate discharge performance.

Another object of the present invention is to provide a method for producing the reactive polymer-supported porous film.

Still another object of the present invention is to provide a method for producing a battery using the reactive polymer-supported porous film.

Further object of the present invention is to provide an electrode/porous film assembly.

According to the present invention, there is provided a reactive polymer-supported porous film for battery separator, comprising a porous film substrate having supported thereon a reactive polymer obtained by reacting a crosslinkable polymer having at least one reactive group selected from the group consisting of 3-oxetanyl group and epoxy group in the molecule, with an acid anhydride, thereby partially crosslinking the polymer.

According to the present invention, there is further provided a method for producing a reactive polymer-supported porous film for battery separator, comprising:

supporting a crosslinkable polymer having at least one reactive group selected from the group consisting of 3-oxetanyl group and epoxy group in the molecule, and an acid anhydride on a porous film substrate;

reacting a part of the reactive groups with the acid anhydride to partially crosslink the reactive polymer; and forming the reactive polymer on the porous film substrate.

According to the present invention, there is further provided a method for producing a battery, comprising:

laminating electrodes on the above-described reactive polymer-supported porous film to prepare a laminate of reactive polymer-supported porous film/electrodes, placing the laminate in a battery container, and pouring an electrolyte solution containing a cationic polymerization catalyst in the battery container to swell at least a part of the reactive polymer in the electrolyte solution or dissolve at least a part of the reactive polymer into the electrolyte solution in at least the vicinity of an interface of the porous film and the electrodes, thereby inducing cationic polymerization of residual reactive groups in the reactive polymer to further crosslink the reactive group, and gelling at least a part of the electrolyte solution to adhere the porous film and the electrodes.

According to the present invention, there is further provided an electrode/porous film assembly obtained by laminating electrodes on above-described reactive polymer-supported porous film to prepare a laminate of reactive polymer-supported porous film/electrodes, and adhering electrodes to the laminate.

BRIEF DESCRIPTION OF THE DRAWING

The attached FIGURE is a cross-sectional view showing a separator (porous film)/electrode assembly and an apparatus for measuring coefficient of area heat shrinkage of the assembly.

Figure 1:
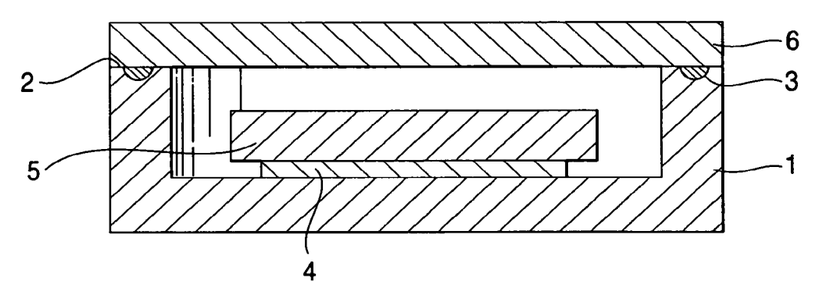

In the drawing:
1: cylindrical container
4: sample (separator (porous film)/electrode assembly)
5: weight
6: lid

DETAILED DESCRIPTION OF THE INVENTION

The reactive polymer-supported porous film for battery separator in accordance with the present invention comprises a porous film substrate having supported thereon a reactive polymer obtained by reacting a crosslinkable polymer having at least one reactive group selected from the group consisting of 3-oxetanyl group and epoxy group in the molecule, with an acid anhydride, thereby partially crosslinking the polymer.

The porous film substrate has a thickness of preferably 3-50 μm. Where the porous film has a thickness less than 3 μm, the film strength is insufficient, and when such a porous film is used as the battery separator, the electrodes may cause internal short circuit. On the other hand, where the porous film has a thickness exceeding 50 μm, the battery using such a porous film as the separator has too large distance between the electrodes, so that the internal resistance of the battery is excessive.

The porous film substrate used has pores having a mean pore diameter of 0.01-5 μm and a porosity of 20-95%, preferably 30-90%, and more preferably 35-85%. Where the porosity ratio is too low, such a porous film when used as a battery separator causes reduction in ionic conduction paths so that sufficient battery performance cannot be obtained. On the other hand, where the porosity is too high, the strength of the film when used as a battery separator is insufficient. In such a case, a porous film substrate having further large thickness has to be used in order to obtain the required strength. This results in unfavorable increase in the internal resistance of the battery.

The porous film has an air permeability of 1,500 seconds/100 cc or smaller, and preferably 1,000 seconds/100 cc or smaller. Where the permeability is too high, such a film when used as a battery separator has low ionic conductivity, so that sufficient battery performance cannot be obtained. Further, the porous film substrate preferably has a puncture strength of 1 N or more. Where the puncture strength is less than 1 N, the substrate breaks when the face pressure is applied to between the electrodes, which may cause internal short circuit.

According to the present invention, the porous film substrate is not particularly limited so long as it has the above-described properties. Considering solvent resistance and redox resistance, a porous film comprising polyolefin resins such as polyethylene and polypropylene is preferably used. Of those, polyethylene resin film is particularly preferably used as the porous film for the reason that the film has a property such that when heated, the resin melts and clogs the pores, thereby giving a so-called shutdown function to the battery. The polyethylene resin used herein includes not only ethylene homopolymer but also copolymers of ethylene with α-olefins such as propylene, butene and hexene. Further, laminate films of porous films such as polytetrafluoroethylene and polyimide with the polyolefin resin porous film have excellent heat resistance. Therefore, such laminate films are also preferably used as the porous film substrate in the present invention.

The crosslinkable polymer used in the present invention means polymers having at least one reactive group selected from the group consisting of 3-oxetanyl group and epoxy group in the molecule. The crosslinkable polymer is preferably radical copolymers of at least one radically polymerizable monomer selected from the group consisting of a radically polymerizable monomer having 3-oxetanyl group and a radically polymerizable monomer having epoxy group, and other radically polymerizable monomer.

The crosslinkable polymer particularly preferably used is a polymer having 3-oxetanyl group and epoxy group in the molecule or a polymer having epoxy group in the molecule. Such a crosslinkable polymer can preferably be obtained by radical polymerization of a radically polymerizable monomer having 3-oxetanyl group, a radically polymerizable monomer having epoxy group, and other radically polymerizable monomer, or radical polymerization of a radically polymerizable monomer having epoxy group and other radically polymerizable monomer.

As conventionally known, 3-oxetasnyl group or epoxy group is capable of reacting with acid anhydride group, and also capable of undergoing cationic polymerization. According to the present invention, utilizing such a reactivity of 3-oxetanyl group and epoxy group, a crosslinkable polymer having at least one reactive group selected from the group consisting of 3-oxetanyl group and epoxy group in the molecule is first reacted with an acid anhydride by means of those reactive groups to form a partially crosslinked reactive polymer, and the reactive polymer is then supported on a porous film substrate to form a reactive polymer-supported porous film for battery separator.

Further, according to the present invention, as described hereinafter, electrodes are laminated on such a reactive polymer-supported porous film to form a laminate of electrodes/porous film. This laminate is dipped in an electrolyte solution containing a cationic polymerization catalyst, preferably an electrolyte solution containing an electrolyte which also functions as a cationic polymerization catalyst, to swell a partially crosslinked crosslinkable polymer on the porous film substrate, i.e., at least a part of the reactive polymer, in the electrolyte solution, or dissolve or disperse the polymer in the electrolyte solution. The reactive polymer is further crosslinked by cationic polymerization of residual reactive groups of the reactive polymer to gel the electrolyte solution in the vicinity of an interface of the porous film and the electrodes, thereby adhering the electrodes and the porous film.

In obtaining the crosslinkable polymer having at least one reactive group selected from the group consisting of 3-oxetanyl group and epoxy group in the molecule, the 3-oxetanyl group-containing radically polymerizable monomer and/or epoxy group-containing radically polymerizable monomer are used in an amount of 5-50% by weight, preferably 10-30% by weight, in terms of its total amount, based on the weight of the entire monomers. Therefore, in the case of obtaining a crosslinkable polymer containing 3-oxetanyl group, the 3-oxetanyl group-containing radically polymerizable monomer is used in an amount of 5-50% by weight, preferably 10-30% by weight, based on the weight of the entire monomers. Similarly, in the case of obtaining a crosslinkable polymer containing epoxy group, the epoxy group-containing radically polymerizable monomer is used in an amount of 5-50% by weight, preferably 10-30% by weight, based on the weight of the entire monomers.

Further, in the case of obtaining a crosslinkable polymer having 3-oxetanyl group and epoxy group by using the 3-oxetanyl group-containing radically polymerizable monomer and the epoxy group-containing radically polymerizable monomer in combination and copolymerizing those monomers with other radically polymerizable monomer, the total amount of the 3-oxetanyl group-containing radically polymerizable monomer and the epoxy group-containing radically polymerizable monomer used is also in a range of 5-50% by weight, preferably 10-30% by weight, based on the weight of the entire monomers used. Of the 3-oxetanyl group-containing radically polymerizable monomer and the epoxy group-containing radically polymerizable monomer, the epoxy group-containing radically polymerizable monomer is used in an amount of 90% by weight or less based on the weight of the sum of those monomers.

In obtaining the 3-oxetanyl group-containing radically polymerizable monomer or the epoxy group-containing radically polymerizable monomer, where the total amount of the 3-oxetanyl group-containing radically polymerizable monomer and the epoxy group-containing radically polymerizable monomer is less than 5% by weight based on the weight of the entire monomers used, this results in increasing the amount of the crosslinkable polymer required for gelling the electrolyte solution, and as a result, performance of the battery obtained deteriorates. On the other hand, the total amount exceeds 50% by weight, the property to maintain the electrolyte solution in a form of a gel deteriorates. As a result, the adhesiveness between the electrodes and the separator in the resulting battery deteriorates.

The 3-oxetanyl group-containing radically polymerizable monomer preferably used is 3-oxetanyl group-containing (meth)acrylate represented by the following formula (I):

wherein $R_1$ represents hydrogen atom or methyl group; and $R_2$ represents hydrogen atom or an alkyl group having 1-6 carbon atoms.

Examples of the 2-oxetanyl group-containing (meth)acrylate include 3-oxetanylmethyl(meth)acrylate, 3-methyl-3-oxetanylmethyl(meth)acrylate, 3-ethyl-3-oxetanylmethyl(meth)acrylate, 3-butyl-3-oxetanylmethyl(meth)acrylate, and 3-hexyl-3-oxetanylmethyl(meth)acrylate. These (meth)acrylates can be used alone or as mixtures of two or more thereof. The term "(meth)acrylate" used herein means acrylate or methacrylate.

The epoxy group-containing radically polymerizable monomer preferably used is an epoxy group-containing (meth)acrylate represented by the following formula (II):

wherein $R_3$ represents hydrogen atom or methyl group; and $R_4$ represents an epoxy group-containing group represented by the following formula (1) or (2):

Examples of the epoxy group-containing (meth)acrylate include 3,4-epoxycyclohexylmethyl(meth)acrylate, and glycidyl(meth)acrylate. These (meth)acrylates can be used alone or as mixtures of two or more thereof.

The other radically polymerizable monomer to be copolymerized with such 3-oxetanyl group-containing radically polymerizable monomer or epoxy group-containing radically polymerizable monomer is preferably at least one selected from (meth)acrylates represented by the following formula (III):

(III)

wherein $R_5$ represents hydrogen atom or methyl group; A represents an oxyalkylene group having 2 or 3 carbon atoms (preferably, oxyethylene group or oxypropylene group): $R_6$ represents an alkyl group having 1-6 carbon atoms or a fluorinated alkyl group having 1-6 carbon atoms; and n is an integer of 0-3, and vinyl ester represented by the following formula (IV):

(IV)

wherein $R_7$ represents methyl group or ethyl group; and $R_9$ represents hydrogen atom or methyl group.

Examples of the (meth)acrylate represented by the formula (III) include methyl (meth)acrylate, ethyl(meth)acrylate, propyl(meth)acrylate, butyl(meth)acrylate, 2,2,2-trifluoroethyl (meth)acrylate, and 2,2,3,3-tetrafluoropropyl(meth)acrylate. Other than those, for example, compounds represented by the following formulae can be used.

wherein n is an integer of 0-3.

Of the monomers included in the (meth)acrylates represented by the above formula (III), examples of the other radically polymerizable monomer that can adjust glass transition point of the reactive polymer to 70° C. or lower include ethyl acrylate, butyl acrylate, propyl acrylate, isooctyl acrylate, 2-ethylhexyl acrylate and dodecyl acrylate.

Examples of the vinyl ester represented by the formula (IV) include vinyl acetate and vinyl propionate.

The crosslinkable polymer containing at least one reactive group selected from the group consisting of 3-oxetanyl group and epoxy group in the molecule can preferably be obtained as radical copolymers via radical copolymerization of the at least one radically polymerizable monomer selected from the group consisting of 3-oxetanyl group-containing radically polymerizable monomer and the epoxy group-containing radically polymerizable monomer with other radically polymerizable monomer using radical polymerization initiators as described above. The radical copolymerization may be conducted by any polymerization processes such as solution polymerization, bulk polymerization, suspension polymerization or emulsion polymerization. From the standpoints of ease of polymerization, molecular weight adjustment and post-treatment, the radical copolymerization is preferably conducted by solution polymerization or suspension polymerization.

The radical polymerization initiators are not particularly limited, and examples thereof include N,N'-azobisisobutyronitrile, dimethyl N,N'-azobis(2-methylpropionate), benzoyl peroxide, and lauroyl peroxide. If required and necessary, molecular weight regulators such as mercaptan can be used in this radical copolymerization.

The crosslinkable polymer preferably has a weight average molecular weight of 10,000 or more. Where the weight average molecular weight is smaller than 10,000, a larger amount of the crosslinking polymers is required for the gelation of the electrolyte solution, resulting in deterioration of the performance of the battery obtained. The upper limit of the weight average molecular weight is not particularly limited. However, the upper limit is about 3,000,000, and preferably 2,500,000, so as to maintain the electrolyte solution in the gel form. The crosslinkable polymer further preferably has a weight average molecular weight of 100,000-2,000,000.

The crosslinkable polymer containing at least one reactive group selected from the group consisting of 3-oxetanyl group and epoxy group in the molecule is conventionally known as disclosed in, for example, JP-A-2001-176555 and JP-A-2002-110245.

The reactive polymer-supported porous film for battery separator is obtained by reacting the crosslinkable polymer with an acid anhydride to partially crosslink the reactive polymer, and supporting the partially crosslinked reactive polymer on a porous film substrate. Crosslinking the crosslinkable polymer with an acid anhydride is due to the reaction between 3-oxetanyl group or epoxy group of the crosslinkable polymer and an acid anhydride, as disclosed in, for example, JP-A-11-43540 and JP-A-11-116663. According to the present invention, the crosslinkable polymer and acid anhydride are reacted utilizing the reactivity of 3-oxetanyl group or epoxy group to partially crosslink the polymer, thereby forming a reactive polymer.

The acid anhydride used to partially crosslink the crosslinkable polymer is represented by the following formula (V)

(V)

wherein R is 2n valent hydrocarbon group, and n is an integer of 1-3.

The "acid anhydride group" used herein means a divalent group in the bracket in the acid anhydride represented by the above formula (V). The hydrocarbon group may have optional substituents so long as it does not adversely affect the reaction between the acid anhydride and the reactive group of the crosslinkable polymer, and further does not adversely affect the battery finally obtained according to the present invention. Examples of the optional substituent include halogen atom, nitro group, alkoxyl group, and aryloxyl group. The hydrocarbon group is that a part of carbon atoms constituting the group may be substituted with hetero atoms such as oxygen atom or nitrogen atom. Further, the hydrocarbon group may have carboxyl group.

In the acid anhydrides represented by the above formula (V), examples of monofunctional acid anhydride (n=1) include malonic anhydride, succinic anhydride, dodecylsuccinic anhydride, maleic anhydride, glutaric anhydride, 2,4-diethylglutaric anhydride, citraconic anhydride, itaconic anhydride, glutaconic anhydride, diglycol anhydride, hexahydrophthalic anhydride, methylhexahydrophthalic anhydride, tetrahydrophthalic anhydride, methyltetrahydrophthalic anhydride, endocis-bicyclo[2.2.1]hepto-5-ene-2,3-dicarboxylic anhydride (trade name: nadic anhydride), methyl-endocis-bicyclo[2.2.1]hepto-5-ene-2,3-dicarboxylic anhydride (trade name: methylnadic acid), endomethylenetetrahydrophthalic anhydride, methylendomethylenetetrahydrophthalic anhydride, chlorendic anhydride, phthalic anhydride, nitrophthalic anhydride, diphenic anhydride and naphtharic anhydride.

In the acid anhydrides represented by the above formula (V), examples of bifunctional acid anhydride (n=2) include pyromellitic anhydride, 3,3',4,4'-benzophenonetetracarboxylic dianhydride, ethyleneglycolbis(anhydrotrimate), and 5-(2,5-dioxotetrahydro-3-furanyl)-3-methyl-cyclohexene-1, 2-dicarboxylic anhydride.

In the acid anhydrides represented by the above formula (V), examples of trifunctional acid anhydride (n=3) include hexahydromellitic anhydride and mellitic anhydride.

Examples of the anhydride having free carboxyl group include β,γ-aconitic anhydride, glycolic anhydride and trimellitic anhydride and polyazelaic anhydride.

The reactive polymer-supported porous film for battery separator according to the present invention is that the crosslinkable polymer is reacted with an acid anhydride to partially crosslink the polymer, thereby forming a reactive polymer, and the reactive polymer is supported on the porous film.

A method of supporting the reactive polymer on the porous film is not particularly limited. For example, the crosslinkable polymer is dissolved in an appropriate organic solvent such as acetone, ethyl acetate or butyl acetate together with an acid anhydride to prepare a solution of a mixture of the crosslinkable polymer and the acid anhydride, this solution is applied to the surface of a porous film by casting or spray coating, or a porous film is dipped in the solution, and the porous film thus treated is dried to remove the organic solvent. The porous film having supported thereon the crosslinkable polymer/acid anhydride mixture is heated to an appropriate temperature to react the crosslinkable polymer with the acid anhydride, thereby partially crosslinking the crosslinkable polymer. Thus, the reactive polymer-supported porous film for battery separator according to the present invention is obtained.

If desired and necessary, onium salt as a catalyst may be supported on the porous film together with the crosslinkable polymer and acid anhydride. The onium salts that can be used are described hereinafter.

The method of supporting the reactive polymer obtained by partially crosslinking the crosslinkable polymer with an acid anhydride, on the porous film substrate is not limited to the above-described method. Besides the above method, for example, the following method can be employed. A solution of the crosslinkable polymer is applied to the porous film and dried. A solution of the acid anhydride is applied to the porous film, or the porous film is dipped in the solution of the acid anhydride, and the porous film thus treated is heated to an appropriate temperature. Another method is that the crosslinkable polymer is previously reacted with the acid anhydride in a solvent to partially crosslink the polymer, thereby forming a reactive polymer, and a solution containing the reactive polymer is applied to the porous film, and dried. Further method is that the crosslinkable polymer is previously reacted with the acid anhydride in a solvent to partially crosslink the polymer, thereby forming a reactive polymer; a solution containing the reactive polymer is applied to an appropriate release sheet and dried; and the resulting coating film is transferred to the porous film substrate.

However, the particularly preferable method according to the present invention is that a solution containing the crosslinkable polymer and the acid anhydride is applied to a release sheet, and dried to form a crosslinkable polymer/acid anhydride layer on the release sheet; the release sheet is laminated on the porous film substrate under heating and pressure to transfer the crosslinkable polymer/acid anhydride layer to the porous film substrate; the crosslinkable polymer/acid anhydride layer is heated to an appropriate temperature to form a reactive polymer on the porous film.

In particular, in producing the crosslinkable polymer, where other radically polymerizable monomer is selected and used in addition to at least one radically polymerizable monomer selected from the group consisting of the radically polymerizable monomer containing 3-ozetanyl group and the radically polymerizable monomer containing epoxy group, and those are copolymerized, glass transition temperature of the crosslinkable polymer obtained can be lowered to preferably 70° C. or lower. Therefore, when the crosslinkable polymer/acid anhydride layer is formed on the release sheet using such a crosslinkable polymer, and this layer is press bonded to the porous film substrate while heating to a temperature of from a glass transition temperature of the crosslinkable polymer to 100° C., the crosslinkable polymer/acid anhydride layer can be transferred to the porous film substrate without adversely affecting the porous film substrate. When the crosslinkable polymer/acid anhydride layer thus transferred is heated to an appropriate temperature, the reactive polymer layer can easily be formed on the porous film.

In transferring the crosslinkable polymer/acid anhydride layer on the release sheet to the porous film substrate, the heating temperature is preferably 100° C. or lower such that deformation or melting of the porous film substrate does not cause by heating. Accordingly, the crosslinkable polymer preferably has the glass transition temperature in a range of 20-60° C.

The representative release sheet preferably used is a polypropylene resin sheet, but is not limited thereto. For example, sheets of polyethylene phthalate, polyethylene, vinyl chloride, engineering plastics or the like, papers (particularly, resin-impregnated papers), synthetic papers, or laminates of those can also be used. If required and necessary, those sheets may be back surface-treated with silicone-based or long chain alkyl-based compounds.

Thus, when the crosslinkable polymer/acid anhydride layer is transferred to the porous film substrate to form the crosslinkable polymer/acid anhydride layer on the porous film substrate, the crosslinkable polymer/acid anhydride layer can securely be formed on the surface of the porous film substrate without invading the crosslinkable polymer or the crosslinkable polymer/acid anhydride into pores inside the porous film, as a result, without clogging pores of the porous film, as being different from the case of, for example, applying a solution of the crosslinkable polymer or the crosslinkable polymer/acid anhydride to the porous film substrate.

The reactive polymer obtained by partially crosslinking the crosslinkable polymer has an insoluble content of generally 1-90%, preferably 3-75%, and more preferably 10-65%. The term "insoluble content" used herein means a proportion of the residual reactive polymer on the porous film when the porous film having supported thereon the partially crosslinked reactive polymer is dipped in an ethylene carbonate/diethyl carbonate (1/1 volume ratio) mixed solvent at room temperature for 2 hours under stirring, and then further dipped in ethyl methyl carbonate.

To obtain the reactive polymer having an insoluble content of 1-90% by the reaction of the crosslinkable polymer and the acid anhydride to partially crosslink the crosslinkable polymer, although not limited, the acid anhydride is used in an amount such that acid anhydride groups of the acid anhydride are 0.005-0.5 part by mol, preferably 0.025-0.4 part by mol, and more preferably 0.05-0.35 part by mol, per mol of the reactive groups of the crosslinkable polymer, and heating reaction conditions between the crosslinkable polymer and the acid anhydride are adjusted. Thus, the reactive polymer having the desired insoluble content can be obtained.

One example for obtaining such a reactive polymer is that the acid anhydride is used in an amount such that the acid anhydride groups are 0.25-0.5 part by mol per mol of the reactive groups of the crosslinkable polymer, and the crosslinkable polymer and the acid anhydride are reacted under heating at 50° C. for 10-500 hours, thereby obtaining the reactive polymer having the insoluble content of 1-90%.

Where the reactive polymer has the insoluble content lower than 1%, when electrodes are press bonded to the porous film having supported thereon such a reactive polymer to obtain a laminate of electrodes/porous film, and this laminate is dipped in an electrolyte solution, many of the reactive polymer dissolves and diffuses in the electrolyte solution. As a result, even though the reactive polymer is further subjected to cationic polymerization to crosslink, effective adhesion cannot be obtained between the electrodes and the porous film. On the other hand, where the reactive polymer has the insoluble content higher than 90%, when a laminate of electrodes/porous film is prepared using such a reactive polymer, and this laminate is dipped in an electrolyte solution, swelling property of the reactive polymer is low. As a result, not only effective adhesion cannot be obtained between the electrodes and the porous film, but also a battery having the resulting electrode/porous film assembly has high internal resistance, which is undesirable in battery performance.

The reactive polymer having the above insoluble content by reacting the crosslinkable polymer with the acid anhydride to react and crosslink a part of the polymer according to the present invention suppresses dissolution and dispersion into the electrolyte solution even when dipped in the electrolyte solution. Therefore, where such a reactive polymer is supported on the porous film, electrodes are laminated on the porous film to prepare a laminate of electrodes/porous film, the laminate is placed in a battery container, and an electrolyte solution containing an electrolyte containing a cationic polymerization catalyst is poured into the battery container, only a part of the reactive polymer in the electrodes/porous laminate swells or dissolves in the electrolyte solution in the vicinity of an interface between the porous film and the electrodes, and due to residual reactive groups which are not used in the partial crosslinking with the acid anhydride, the reactive polymer undergoes cationic polymerization by a cationic polymerization catalyst in the electrolyte solution, preferably by an electrolyte also serving as a cationic polymerization catalyst to further crosslink, thereby gelling the electrolyte solution and strongly adhering the electrodes to the porous film. Thus, an electrode/porous film assembly (i.e., a separator in a battery obtained) can be obtained.

The partially crosslinked reactive polymer has the above-described insoluble content. Therefore, even if the polymer is dipped in the electrolyte solution, dissolution or diffusion of the reactive polymer into the electrolyte solution is prevented or minimized, and the reactive polymer is effectively used to adhere the electrodes to the porous film. As a result, by the use of a relatively small amount of the reactive polymer, the electrodes and the porous film can be adhered stably and also further strongly.

The reactive polymer-supported porous film according to the present invention has excellent wettability to the electrolyte solution. Therefore, when a laminate comprising a positive electrode material, a negative electrode material, and a separator interposed therebetween, or a cylindrically wound roll of such a laminate is placed in a battery container, and an electrolyte solution is poured into the battery container, the electrolyte solution rapidly permeates in and spreads over the entire separator. As a result, the productivity can be increased in the battery production. Further, since the electrolyte solution spreads over the entire separator, and contributes to bond the electrodes and the porous film, thereby strongly adhering the electrodes and the porous film, the porous film has a small coefficient of heat shrinkage of generally 20% or lower, and preferably 15% or lower, even if the porous film is placed under high temperature environment such as 150° C.

Thus, the reactive polymer-supported porous film according to the present invention can suitably be used for the production of a battery. The method for producing a battery using the reactive polymer-supported porous film according to the present invention is described below.

Electrodes are laminated on or are wound around the reactive polymer-supported porous film to obtain a laminate of electrodes/reactive polymer-supported porous film. The laminate is placed in a battery container comprising a metal can or a laminate film. If required and necessary, terminals are welded. A given amount of an electrolyte solution having a cationic polymerization catalyst dissolved therein is poured in the battery container. The battery container is sealed or the opening of the battery container is sealed. At least a part of the reactive polymer supported on the porous film is swollen at least in the vicinity of the interface between the porous film and the electrodes in the electrolyte solution or dissolves or disperses in the electrolyte solution. The reactive polymer is crosslinked by cationic polymerization to gel at least a part of the electrolyte solution, thereby adhering the electrodes and the porous film. Thus, a battery in which the electrodes are strongly adhered to the porous film as a separator can be obtained.

The reactive polymer functions to adhere the electrodes to the porous film by the crosslinking thereof via cationic polymerization of reactive groups of the reactive polymer, thereby gelling the electrolyte solution at least in the vicinity of the interface between the porous film and the electrodes.

The reactive polymer can be cationically polymerized at ordinary temperature for crosslinking, although depending on the structure thereof, the amount of the reactive polymer supported on the porous film, and the type and amount of the cationic polymerization catalyst. The cationic polymerization can be promoted by heating. In this case, heating is generally conducted at a temperature of about 40-100° C. for about 0.5-24 hours, although depending on the thermal resistance of materials constituting the battery and productivity of the battery. To swell, or dissolve and diffuse the polymer in an amount sufficient to adhere the electrodes to the porous film, the battery container may be allowed to stand at ordinary temperature for about several hours after pouring the electrolyte solution in the battery container.

The laminate of the electrodes/reactive polymer-supported porous film is satisfactory as long as the electrodes are simply laminated on the reactive polymer-supported porous film. Therefore, for example, negative electrode/porous film/positive electrode, negative electrode/porous film/positive electrode/porous film, and the like can be used as the laminate of the electrodes/reactive polymer-supported porous film according to the structure and form of the battery.

The electrolyte solution is a solution prepared by dissolving an electrolyte salt in an appropriate organic solvent. The electrolyte salt that can be used is, for example, salts comprising a cation component and an anion component. The cation component is derived from, for example, hydrogen, alkali metals (such as lithium, sodium or potassium), alkaline earth metals (such as calcium or strontium), or tertiary or quaternary ammonium ions. The anion component is derived from, for example, inorganic acids (such as hydrochloric acid, nitric acid, phosphoric acid, sulfuric acid, fluoroboric acid, hydrofluoric acid, hexafluorophosphoric acid or perchloric acid), or organic acids (such as carboxylic acid, organic sulfonic acid or fluorine-substituted organic sulfonic acid). Of those, electrolyte salts containing alkali metal ions as cation components are particularly preferably used.

Examples of the electrolyte salts containing alkali metal salts as cation components include alkali metal perchlorates, such as lithium perchlorate, sodium perchlorate or potassium perchlorate; alkali metal tetrafluoroborates, such as lithium tetrafluoroborate, sodium tetrafluoroborate or potassium tetrafluoroborate; alkali metal hexafluorophosphatets, such as lithium hexafluorophosphate or potassium hexafluorophosphate; alkali metal trifluoroacetates, such as lithium trifluoroacetate; and alkali metal trifluoromethanesulfonates, such as lithium trifluoromethanesulfonate.

In particular, in the case of producing lithium ion secondary battery in accordance with the present invention, lithium hexafluorophosphate, lithium tetrafluoroborate, lithium perchlorate or the like is suitably used as the electrolyte salt.

The solvent used for the above electrolyte salts can be any solvent so long as it can dissolve the electrolyte salt. Representative example of the solvent is a non-aqueous solvent, and examples thereof include cyclic esters such as ethylene carbonate, propylene carbonate, butylene carbonate or γ-butyrolactone; ethers such as tetrahydrofuran or dimethoxyethane; and chain esters such as dimethyl carbonate, diethyl carbonate or ethyl methyl carbonate. Those can be used alone or as mixtures of two or more thereof.

The amount of the electrolyte salts used is appropriately determined depending on the type and amount of a solvent used. The electrolyte salts are generally used in an amount such that the resulting gel electrolyte has the electrolyte salt concentration of 1-50% by weight.

Onium salts are preferably used as the cationic polymerization catalyst. Examples of the onium salt includes onium salts comprising cation components such as ammonium ion, phosphonium ion, arsonium ion, stibonium ion or iodonium ion, and anion components such as tetrafluoroborate, hexafluorophosphate, trifluoromethanesulfonate or perchlorate.

Of those electrolyte salts, lithium tetrafluoroborate and lithium hexafluorophosphate per se function as a cation polymerization catalyst. Therefore, those are particularly preferably used as an electrolyte salt functioning as both electrolyte salt and cationic polymerization initiator. In this case, lithium tetrafluoroborate and lithium hexafluorophosphate may be used alone or as a mixture thereof.

The present invention is described in more detail by reference to the following Examples, but it should be understood that the invention is not construed as being limited thereto. Unless otherwise indicated, all parts are by weight.

Properties of a porous film substrate and battery properties are evaluated as follows.

Thickness of Porous Film

The thickness of a porous film was determined by measurement with a $1/10,000$ mm thickness gauge and based on a scanning type electron micrograph (magnification: 10,000) of a cross section of a porous film.

Porosity of Porous Film

Based on the weight "W" (g) per unit area "S" (cm$^2$) of porous film, the mean thickness "t" (cm) thereof, and the density "d" (g/cm$^3$) of a resin constituting a porous film, the porosity was calculated by the following equation:

$$\text{Porosity}(\%) = [1-(100 W/S/t/d)] \times 100$$

Air Permeability of Porous Film

The permeability was determined according to JIS P 8117.

Puncture Strength

Puncture test was conducted with a compression tester KES-G5 manufactured by Kato Tech K.K. The maximum load was read from a load-deformation curve obtained from the measurement and was defined as puncture strength. A needle used had a diameter of 1.0 mm and a radius of curvature at the tip of 0.5 mm, and the needle was penetrated at a rate of 2 cm/second.

Insoluble Content

A porous film having supported thereon a given amount of a reactive polymer was weighed to measure its weight B. The reactive polymer-supported porous film was dipped in a mixed solvent of ethylene carbonate/diethyl carbonate (1:1 by volume) at room temperature for 2 hours, washed and dried. The reactive polymer-supported porous film thus treated was weighed to measure its weight C. Insoluble content of the reactive polymer was calculated by the following equation.

$$\text{Insoluble content}(\%) = ((A-(B-C)/A) \times 100$$

Wettability of Reactive Polymer-Supported Porous Film to Electrolyte Solution

A reactive polymer-supported porous film was dipped in an electrolyte solution comprising an ethylene carbonate/diethyl carbonate (1:1 by weight ratio) mixed solvent having dissolved therein lithium hexafluorophosphate in a concentration of 1.0 mol/l. The porous film was taken out of the mixed solvent, and was immediately interposed between two platinum electrodes, and 1 kHz alternating current resistance was measured. The 1 kHz alternating current resistances were measured by varying the dipping time, and the dipping time when the resistance is the lower limit was determined, thereby evaluating wettability by electrolyte solution.

Glass Transition Temperature of Crosslinkable Polymer

Glass transition temperature of a crosslinkable polymer was measured as follows. A solution of the crosslinkable polymer was cast on a release paper, and dried to obtain a sheet having a thickness of 0.2-0.5 mm and a width of 5 mm. Glass transition temperature of this sheet was measured using DMS 120 manufactured by Seiko Instruments Inc. with a chuck distance of 10 mm in a bending mode at 10 kHz. Temperature rising rate was 5° C./min and temperature range was 20-200° C. The glass transition temperature was determined from a peak temperature of tan δ.

Measurement of Coefficient of Area Heat Shrinkage of Separator (Porous Film)/Electrodes Assembly Positive electrode/porous film/negative electrode laminates obtained in the Examples and the Comparative Examples were punched into a predetermined size, and each piece was impregnated with an electrolyte solution composed of an ethylene carbonate/diethyl carbonate (1:1 by weight ratio) mixed solvent having dissolved therein lithium hexafluorophosphate in a concentration of 1.0 mol/l to prepare a sample.

An apparatus in which O ring 3 is fitted in a cyclic upper edge surface 2 of a circumferential wall of a circular container 1 made of SUS as shown in the FIGURE was provided. The sample 4 obtained above was placed on the bottom of the container, and a weight 5 was placed on the sample. The container was covered with a lid 6 to seal the container. The container containing the sample was placed in a drier at 150° C. for 1 hour and then gradually cooled. The sample was taken out of the container. A separator (porous film) of the sample was peeled from the positive and negative electrodes. Area of the separator (porous film) was read by scanner, and was compared with area of the original porous film to determine a coefficient of area heat shrinkage.

Measurement of Adhesive Force between Electrode Sheet and Separator

Before conducting charge and discharge test, a laminate seal type battery was disintegrated to measure adhesive force as follows. The laminate seal type battery was disintegrated to take out a positive electrode sheet/separator/negative electrode sheet laminate. The interface of the electrode sheets/separator was peeled 5 mm from the edge, and the edge of the electrode sheet and the edge of the separator were alternatively peeled in 180° direction at a rate of 1 mm/sec. Load at this peeling was measured. This load was divided by width of electrode sheet/separator to obtain adhesive force between the electrode sheet and the separator.

Reference Example 1

Preparation of Electrode Sheet

85 Parts of lithium cobalt oxide as a positive electrode active material (Cell Seed C-10 manufactured by Nippon Chemical Industrial Co., Ltd.), 10 parts of acetylene black as a conductive auxiliary agent (Denka Black manufactured by Denki Kagaku Kogyo Kabushiki Kaisha) and 5 parts of a vinylidene fluoride resin as a binder (KF polymer L #1120 manufactured by Kureha Chemical Industry, Co., Ltd.) were mixed together. Using N-methyl-2-pyrrolidone, a slurry of the resulting mixture was prepared so as to have a solid concentration of 15% by weight. The slurry was applied to one side of a 20 μm thick aluminum foil (current collector) at a build-up of 200 μm, dried at 80° C. for 1 hour and then at 120° C. for 2 hours, and pressed with a roll press, to prepare a positive electrode sheet having an active material layer thickness of 100 μm.

80 Parts of mesocarbon microbeads as a negative electrode active material (MCMB 6-28 manufactured by Osaka Gas Chemical Co., Ltd.), 10 parts of acetylene black as a conductive auxiliary agent (Denka Black manufactured by Denki Kagaku Kogyo Kabushiki Kaisha) and 10 parts of a vinylidene fluoride resin as a binder (KF polymer L #1120 manufactured by Kureha Chemical Industry, Co., Ltd.) were mixed. Using N-methyl-2-pyrrolidone, a slurry of the resulting mixture was prepared so as to have a solid concentration of 15% by weight. The slurry was applied to one side of a 20 μm thick copper foil (current collector) at a build-up of 200 μm, dried at 80° C. for 1 hour and then at 120° C. for 2 hours, and pressed with a roll press, to prepare a negative electrode sheet having an active material layer thickness of 100 μm.

Preparation of Reference Battery

A polyethylene resin-made porous film (separator) having a thickness of 16 μm, a porosity of 40%, an air permeability of 300 second/100 cc and a puncture strength of 3.0 N was provided. The negative sheet obtained in Reference Example 1, the porous film provided above and the positive electrode sheet obtained in Reference Example 1 were laminated in this order to obtain a positive electrode/porous film/negative electrode laminate. The resulting laminate was placed in an aluminum laminate package. An electrolyte solution containing an ethylene carbonate/diethyl carbonate (1:1 in weight ratio) mixed solvent dissolving lithium hexafluorophosphate therein at a concentration of 1.0 mol/liter was poured into the package. The package was sealed to assemble a lithium ion secondary battery. The battery was charged and discharged at a rate of 0.1 CmA three times. Subsequently, the battery was further charged at 0.1 CmA and then discharged at 1 CmA, to determine the 1 CmA-discharge capacity A. Regarding the separator, wetting time by the electrolyte solution measured by the above-described method was 5 seconds. Further, coefficient of area heat shrinkage of the separator in the positive electrode/porous film/negative electrode laminate was 72%.

Discharge Characteristics of Batteries of Examples or Comparative Examples

Laminate seal-type lithium ion secondary batteries obtained in the following Examples and Comparative Examples were charged and discharged at a rate of 0.1 CmA three times. Subsequently, the batteries were further charged at 0.1 CmA and then discharged at 1 CmA, to determine the 1 CmA-discharge capacity B. Battery characteristics were evaluated on the basis of the percentage (%) of the discharge capacity B to the discharge capacity A of the reference battery.

Production Example 1

Production of Crosslinkable Polymer A
(3,4-epoxycyclohexylmethyl acrylate Monomer
Component: 5% by Weight, 3-oxetanyl
Group-Containing Monomer Component: 20% by
Weight, butyl acrylate Monomer Component: 25%
by Weight and methyl methacrylate Monomer
Component: 50% by Weight; Weight Average
Molecular Weight: 317,000)

40.0 g of methyl methacrylate, 4.0 g of 3,4-epoxycyclohexylmethyl acrylate, 16.0 g of 3-ethyl-3-oxetanylmethyl methacrylate, 20.0 g of n-butyl acrylate, 10.0 g of ethyl acetate and 0.10 g of N,N'-azobisisobutyronitrile were placed in a polymerization reaction vessel, and mixed for 30 minutes under stirring while introducing nitrogen gas. Temperature was elevated to 70° C. When about 2 hours passed, radical polymerization began to proceed with increase of viscosity of the mixture. Polymerization was further conducted for additional 5 hours to increase the viscosity up to a degree that stirring is impossible. 20.0 g of ethyl acetate was added, and polymerization was further conducted for additional 2 hours until stirring becomes impossible.

20.0 g of ethyl acetate was added, and the polymerization was further conducted for 2 hours. 70 g of ethyl acetate was added to the reaction mixture, and the resulting mixture was stirred, diluted, allowed to stand one night, and gradually cooled. 0.10 g of N,N'-azobisisobutyronitrile and 120 g of ethyl acetate were added, and polymerization was conducted at 70° C. for 8 hours to obtain an ethyl acetate solution of the crosslinkable polymer A in a concentration of 25% by weight.

The thus obtained ethyl acetate solution of the crosslinkable polymer A had slight yellow, and was viscous and transparent. As a result of molecular weight measurement by GPC, the crosslinkable polymer A had a weight average molecular weight of 317,000 and a number average molecular weight of 98,800. Further, the crosslinkable polymer A had a glass transition temperature of 51° C.

Production Example 2

Production of Crosslinkable Polymer B
(3,4-epoxycyclohexylmethyl acrylate Monomer Component: 5% by Weight, 3-oxetanyl Group-Containing Monomer Component: 20% by Weight and methyl methacrylate Monomer Component: 75% by Weight)

60.0 g of methyl methacrylate, 16.0 g of 3-ethyl-3-oxetanylmethyl methacrylate, 4.0 g of 3,4-epoxycyclohexylmethyl acrylate, 226.6 g of ethylene carbonate and 0.15 g of N,N'-azobisisobutyronitrile were placed in a three-necked flask equipped with a reflux condenser, and mixed for 30 minutes under stirring while introducing nitrogen gas. Temperature was elevated to 70° C. to conduct radical polymerization for 8 hours. The reaction mixture thus obtained was cooled to 40° C. 226.6 g of diethyl carbonate and 0.15 g of N,N'-azobisisobutyronitrile were added to the reaction mixture, and the resulting mixture was again heated to 70° C. to further conduct radical polymerization for 8 hours. The reaction mixture thus obtained was cooled to 40° C. to obtain an ethylene carbonate/diethyl carbonate mixed solvent solution (concentration: 15% by weight) of the crosslinkable polymer B.

100 g of the polymer solution was introduced into 600 ml of methanol while stirring with a high speed mixer to precipitate the polymer. The polymer was filtered off, washed with methanol with several times, and placed in a drying pipe. Dry nitrogen gas (dew point: −150° C. or lower) obtained by vaporizing liquid nitrogen was passed through the pipe to dry the polymer. The polymer is further vacuum dried in a desiccator for 6 hours to obtain the crosslinkable polymer B. The crosslinkable polymer B thus obtained was a white powder. As a result of molecular weight measurement by GPC, the crosslinkable polymer B had a weight average molecular weight of 344,400 and a number average molecular weight of 174,500. Further, the crosslinkable polymer B had a glass transition temperature of 116° C.

Example 1

An ethyl acetate solution of the crosslinkable polymer A obtained in Production Example 1 was diluted with ethyl acetate to obtain a crosslinkable polymer solution of 10 wt % concentration. Separately, an ethyl acetate solution of phthalic anhydride of 5 wt % concentration was prepared. The phthalic anhydride solution was gradually added dropwise to the solution of the crosslinkable polymer A while stirring to prepare a mixed solution of the crosslinkable polymer A and phthalic anhydride. The ratio of mol number of acid anhydride groups of phthalic anhydride to mol number of reactive groups of the crosslinkable polymer was 0.025.

The mixed solution of the crosslinkable polymer A and phthalic anhydride was applied to a release paper with No. 8 wire bar, and heated to 50° C. to form a crosslinkable polymer A/phthalic anhydride layer composed of a mixture of the crosslinkable polymer A and phthalic anhydride on the release paper. The release paper was laminated on a polyethylene resin porous film substrate (film thickness: 16 μm; porosity: 40%; air permeability: 300 sec/100 cc; puncture strength of 3.0 N) so as to face the crosslinkable polymer A/phthalic anhydride layer with the porous film substrate. The resulting laminate was passed through hot rolls at 70° C., and the release paper was removed to obtain a crosslinkable polymer-supported porous film having the crosslinkable polymer supported thereon at a coating density of 1.1 g/m$^2$ per one side.

The crosslinkable polymer-supported porous film was placed in a thermostat chamber at 50° C. for 48 hours to react the crosslinkable polymer supported on the porous film with phthalic anhydride, thereby partially crosslinking the crosslinkable polymer. Thus, a reactive polymer-supported porous film was obtained. Insoluble content of the reactive polymer in the reactive polymer-supported porous film was 40%. Further, the electrolyte solution dipping time of this reactive polymer-supported porous film was 15 seconds.

The negative electrode sheet obtained in Reference Example 1, the reactive polymer-supported porous film obtained above and the positive electrode sheet obtained in Reference Example 1 were laminated in this order to prepare a laminate of separator/electrodes. This laminate was placed in an aluminum laminate package, and an electrolyte solution of an ethylene carbonate/diethyl carbonate (1:1 in weight ratio) mixed solvent dissolving lithium hexafluorophosphate at a concentration of 1.0 mol/liter was poured in the package. The package was sealed. The package was heated at 70° C. for 7 hours to perform cationic polymerization and crosslink the reactive polymer, thereby adhering the electrode sheets to the porous film (separator) and at the same time, partially gelling the electrolyte solution. Thus, a laminate seal-type battery was obtained.

Adhesive force between electrode sheets and separator in this battery was 0.16 N/cm in the positive electrode and 0.20 N/cm in the negative electrode. The 1 CmA discharge capacity of this battery was 99% of the discharge capacity of the reference battery. Coefficient of area heat shrinkage of the separator in the separator/electrode assembly obtained using the reactive polymer-supported porous film was 1.0%.

Example 2

A reactive polymer-supported porous film was obtained in the same manner as in Example 1, except that the ratio of mol number of acid anhydride groups of phthalic anhydride to mol number of reactive groups of the crosslinkable polymer A was 0.25, and the time placed in the 50° C. thermostat chamber was changed to 12 hours. Insoluble content of the reactive polymer in the reactive polymer-supported porous film was 85%. Further, the electrolyte solution dipping time of this reactive polymer-supported porous film was 30 seconds.

A laminate seal-type battery was obtained in the same manner as in Example 1 except for using the reactive polymer-supported porous film obtained above. Adhesive force between electrode sheets and separator in this battery was 0.10 N/cm in the positive electrode and 0.10 N/cm in the negative electrode. The 1 CmA discharge capacity of this battery was 92% of the discharge capacity of the reference battery. Coefficient of area heat shrinkage of the separator in the separator/electrode assembly obtained using the reactive polymer-supported porous film was 5.0%.

Example 3

A reactive polymer-supported porous film was obtained in the same manner as in Example 1, except that succinic anhydride was used in place of phthalic anhydride, and the time placed in the 50° C. thermostat chamber was changed to 300 hours. The ratio of mol number of acid anhydride groups of succinic anhydride to mol number of reactive groups of the crosslinkable polymer A was 0.25. Insoluble content of the reactive polymer in the reactive polymer-supported porous film was 50%. Further, the electrolyte solution dipping time of this reactive polymer-supported porous film was 20 seconds.

A laminate seal-type battery was obtained in the same manner as in Example 1 except for using the reactive polymer-supported porous film obtained above. Adhesive force between electrode sheets and separator in this battery was 0.20 N/cm in the positive electrode and 0.10 N/cm in the negative electrode. The 1 CmA discharge capacity of this battery was 93% of the discharge capacity of the reference battery. Coefficient of area heat shrinkage of the separator in the separator/electrode assembly obtained using the reactive polymer-supported porous film was 1.3%.

Example 4

A reactive polymer-supported porous film was obtained in the same manner as in Example 3, except that the ratio of mol number of acid anhydride groups of succinic anhydride to mol number of reactive groups of the crosslinkable polymer A was 0.05, and the time placed in the 50° C. thermostat chamber was changed to 96 hours. Insoluble content of the reactive polymer in the reactive polymer-supported porous film was 5%. Further, the electrolyte solution dipping time of this reactive polymer-supported porous film was 10 seconds.

A laminate seal-type battery was obtained in the same manner as in Example 1 except for using the reactive polymer-supported porous film obtained above. Adhesive force between electrode sheets and separator in this battery was 0.13 N/cm in the positive electrode and 0.10 N/cm in the negative electrode. The 1 CmA discharge capacity of this battery was 99% of the discharge capacity of the reference battery. Coefficient of area heat shrinkage of the separator in the separator/electrode assembly obtained using the reactive polymer-supported porous film was 5.0%.

Example 5

A reactive polymer-supported porous film was obtained in the same manner as in Example 1, except that 2,4-diethylglutaric anhydride was used in place of phthalic anhydride, and the time placed in the 50° C. thermostat chamber was changed to 120 hours. The ratio of mol number of acid anhydride groups of 2,4-diethylglutaric anhydride to mol number of reactive groups of the crosslinkable polymer A was 0.25. Insoluble content of the reactive polymer in the reactive polymer-supported porous film was 35%. Further, the electrolyte solution dipping time of this reactive polymer-supported porous film was 15 seconds.

A laminate seal-type battery was obtained in the same manner as in Example 1 except for using the reactive polymer-supported porous film obtained above. Adhesive force between electrode sheets and separator in this battery was 0.30 N/cm in the positive electrode and 0.24 N/cm in the negative electrode. The 1 CmA discharge capacity of this battery was 92% of the discharge capacity of the reference battery. Coefficient of area heat shrinkage of the separator in the separator/electrode assembly obtained using the reactive polymer-supported porous film was 0.9%.

Example 6

A reactive polymer-supported porous film having supported thereon the reactive polymer having the insoluble content of 40%, obtained in the same manner as in Example 1 was prepared. The electrolyte solution dipping time of this reactive polymer-supported porous film was 15 seconds.

The negative electrode sheet obtained in Reference Example 1, the reactive polymer-supported porous film obtained above and the positive electrode sheet obtained in Reference Example 1 were laminated in this order to prepare a laminate of separator/electrodes. This laminate was press adhered at a temperature of 80° C. under pressure of 5 kgf/cm$^2$ for 2 minutes. This laminate was placed in an aluminum laminate package, and an electrolyte solution of an ethylene carbonate/diethyl carbonate (1:1 in weight ratio) mixed solvent dissolving lithium hexafluorophosphate at a concentration of 1.0 mol/liter was poured in the package. The package was sealed. The package was heated at 70° C. for 7 hours to perform cationic polymerization and crosslink the reactive polymer, thereby adhering the electrode sheets to the porous film (separator) and at the same time, partially gelling the electrolyte solution. Thus, a laminate seal-type battery was obtained.

Adhesive force between electrode sheets and separator in this battery was 0.30 N/cm in the positive electrode and 0.35 N/cm in the negative electrode. The 1 CmA discharge capacity of this battery was 88% of the discharge capacity of the reference battery. Coefficient of area heat shrinkage of the separator in the separator/electrode assembly obtained using the reactive polymer-supported porous film was 0.3%.

Example 7

The crosslinkable polymer B obtained in Production Example 2 was dissolved in ethyl acetate at room temperature to obtain a crosslinkable polymer solution of 10 wt % concentration. Separately, an ethyl acetate solution of phthalic anhydride of 5 wt % concentration was prepared. The phthalic anhydride solution was gradually added dropwise to the solution of the crosslinkable polymer A while stirring to prepare a mixed solution of the crosslinkable polymer B and phthalic anhydride. The ratio of mol number of acid anhydride groups of phthalic anhydride to mol number of reactive groups of the crosslinkable polymer was 0.025.

The mixed solution of the crosslinkable polymer B and phthalic anhydride was applied to one side of a polyethylene resin porous film substrate (film thickness: 16 μm; porosity: 40%; air permeability: 300 sec/100 cc; puncture strength of 3.0 N) with No. 8 wire bar, and heated to 50° C. to evaporate ethyl acetate. The mixed solution was also applied to another side of the substrate, and heated to evaporate ethyl acetate, thereby obtaining a crosslinkable polymer-supported porous film having the crosslinkable polymer supported thereon at a coating density of 2.0 g/m$^2$ per one side.

The crosslinkable polymer-supported porous film was placed in a thermostat chamber at 50° C. for 60 hours to react the crosslinkable polymer supported on the porous film with phthalic anhydride, thereby partially crosslinking the crosslinkable polymer. Thus, a reactive polymer-supported porous film was obtained. Insoluble content of the reactive polymer in the reactive polymer-supported porous film was 45%. Further, the electrolyte solution dipping time of this reactive polymer-supported porous film was 650 seconds.

The negative electrode sheet obtained in Reference Example 1, the reactive polymer-supported porous film obtained above and the positive electrode sheet obtained in Reference Example 1 were laminated in this order to prepare a laminate of separator/electrodes. This laminate was placed in an aluminum laminate package, and an electrolyte solution of an ethylene carbonate/diethyl carbonate (1:1 in weight ratio) mixed solvent dissolving lithium hexafluorophosphate at a concentration of 1.0 mol/liter was poured in the package. The package was sealed. The package was heated at 70° C. for 7 hours to perform cationic polymerization and crosslink the reactive polymer, thereby adhering the electrode sheets to the porous film (separator) and at the same time, partially gelling the electrolyte solution. Thus, a laminate seal-type battery was obtained.

Adhesive force between electrode sheets and separator in this battery was 0.20 N/cm in the positive electrode and 0.10 N/cm in the negative electrode. The 1 CmA discharge capacity of this battery was 98% of the discharge capacity of the reference battery. Coefficient of area heat shrinkage of the separator in the separator/electrode assembly obtained using the reactive polymer-supported porous film was 1.5%.

Comparative Example 1

Poly(vinylidene fluoride/hexafluoropropylene) copolymer (Kynar 2801 manufactured by Atofina Chemicals, Inc.) was dissolved in N-methyl-2-pyrrolidone to prepare a polymer solution having a concentration of 10% by weight. The polymer solution was applied to both sides of a polyethylene resin porous film (film thickness: 16 µm, porosity: 40%, air permeability: 30 seconds/100 cc and puncture strength: 3.0 N) with a wire bar (#20), and heat dried at 60° C. to volatilize N-methyl-2-pyrrolidone. As a result, a polyethylene resin porous film having the poly(vinylidene fluoride/hexafluoropropylene) copolymer supported on both sides thereof was obtained. The electrolyte solution dipping time of this poly(vinylidene fluoride/hexafluoropropylene) copolymer-supported porous film was 5 minutes.

The negative electrode sheet obtained in the Reference Example 1, the poly (vinylidene fluoride/hexafluoropropylene) copolymer-supported porous film obtained above and the positive electrode sheet obtained in the Reference Example 1 were laminated in this order, and press bonded at a temperature of 80° C. under a pressure of 5 kg/cm² for 1 minute, to obtain a laminate of the separator/electrodes. The laminate of the separator/electrodes was placed in an aluminum laminate package, and an electrolyte solution of an ethylene carbonate/diethyl carbonate (1:1 in weight ratio) mixed solvent dissolving lithium hexafluorophosphate at a concentration of 1.0 mol/liter was poured in the package. The package was sealed to obtain a laminate seal-type battery.

Adhesive force between electrode sheets and separator in this battery was 0.20 N/cm in the positive electrode and 0.09 N/cm in the negative electrode. The 1 CmA discharge capacity of this battery was 85% of the discharge capacity of the reference battery. Coefficient of area heat shrinkage of the separator in the separator/electrode assembly obtained using the poly(vinylidene fluoride/hexafluoropropylene) copolymer-supported porous film was 30%.

Comparative Example 2

A laminate seal-type battery was obtained in the same manner as in Comparative Example 1 except for changing the concentration of the poly(vinylidene fluoride/hexafluoropropylene) copolymer solution to 5% by weight. Adhesive force between electrode sheets and separator in this battery was 0.05 N/cm in the positive electrode and 0.0 N/cm in the negative electrode. The 1 CmA discharge capacity of the battery was 96% of the discharge capacity of the reference battery.

The electrolyte solution dipping time of this poly(vinylidene fluoride/hexafluoropropylene) copolymer-supported porous film was 30 seconds. Coefficient of area heat shrinkage of the separator in the separator/electrode assembly obtained using the poly(vinylidene fluoride/hexafluoropropylene) copolymer-supported porous film was 60%.

As described above, the reactive polymer-supported porous film for battery separator according to the present invention comprises a porous film substrate having supported thereon a reactive polymer obtained by reacting a crosslinkable polymer having at least one reactive group selected from the group consisting of 3-oxetanyl group and epoxy group in the molecule, with an acid anhydride, thereby partially crosslinking the polymer.

Therefore, the electrode/porous film assembly can be obtained by laminating electrodes on such a reactive polymer-supported porous film to prepare a laminate of reactive polymer-supported porous film/electrodes, placing the laminate in a battery container, and pouring an electrolyte solution containing a cationic polymerization catalyst in the battery container to swell at least a part of the reactive polymer in the electrolyte solution or dissolve at least a part of the reactive polymer into the electrolyte solution in at least the vicinity of an interface of the porous film and the electrodes, thereby inducing cationic polymerization of residual reactive groups in the reactive polymer to further crosslink the reactive group, and gelling at least a part of the electrolyte solution to strongly adhere the porous film and the electrodes.

Further, according to the reactive polymer-supported porous film, the reactive polymer is previously partially crosslinked. Therefore, when the laminate of reactive polymer-supported porous film/electrodes is dipped in the electrolyte solution, the reactive polymer is suppressed to dissolve and disperse in the electrolyte solution from the laminate, and at the same time, the reactive polymer swells. As a result, the electrodes can be adhered to the porous film (separator) by using a small amount of the reactive polymer. In addition, the porous film has excellent ion permeability, and well functions as a separator. Further, the reactive polymer does not excessively dissolve and disperse in the electrolyte solution, thereby not adversely affecting the electrolyte solution.

According to the preferred embodiment of the present invention, the crosslinkable polymer layer can be transferred to the porous film substrate at relatively low temperature to support thereon, where the crosslinkable polymer is partially crosslinked. As a result, the reactive polymer-supported porous film securely having the reactive polymer on the surface thereof can be obtained. Further, according to the present invention, the reactive polymer-supported porous film has excellent electrolyte solution dipping property, and this enables productivity of battery production to increase.

Thus, according to the present invention, a battery having low internal resistance and high rate performance can easily be obtained with good productivity while forming the electrode/separator assembly having strong adhesion between electrodes and separator in the production step of battery in situ.

It should further be apparent to those skilled in the art that various changes in form and detail of the invention as shown and described above may be made. It is intended that such changes be included within the spirit and scope of the claims appended hereto.

This application is based on Japanese Patent Application No. 2004-324358 filed Nov. 8, 2004, the disclosure of which is incorporated herein by reference in its entirety.

What is claimed is:

1. A method for producing a reactive polymer-supported porous film for battery separator, comprising:

supporting (i) a crosslinkable polymer having at least one reactive group selected from the group consisting of 3-oxetanyl group and epoxy group in the molecule, and (ii) an acid anhydride on a porous film substrate;

reacting a part of the reactive groups with the acid anhydride to partially crosslink the reactive polymer; and forming the reactive polymer on the porous film substrate, wherein the acid anhydride is in an amount such that acid anhydride groups of the acid anhydride are 0.025 to 0.25 part by mol per mol of the reactive groups of the crosslinkable polymer.

2. A method for producing a reactive polymer-supported porous film for battery separator, comprising:

applying a solution containing (i) a crosslinkable polymer having at least one reactive group selected from the group consisting of 3-oxetanyl group and epoxy group in the molecule, and (ii) and acid anhydride to a release sheet;

drying the solution to form a crosslinkable polymer/acid anhydride layer on the release sheet; and transferring the layer to the porous film substrate, thereby supporting the crosslinkable polymer and acid anhydride on the porous film substrate.

3. The method as claimed in claim 2, further comprising heating the crosslinkable polymer/acid anhydride layer having a glass transition temperature of 70° C. or lower to a temperature of 100° C. or lower before transferring the layer to the porous film substrate.

* * * * *